United States Patent [19]

Aoyama et al.

[11] Patent Number: 4,992,957
[45] Date of Patent: Feb. 12, 1991

[54] PRINTER AND METHOD FOR UTILIZING CHARACTER CODES AND CONTROL CODES WITHIN A PRINTER

[75] Inventors: Tsuyoshi Aoyama; Tetsuro Takahashi, both of Suwa, Japan

[73] Assignee: Seiko Epson Corporation, Tokyo, Japan

[21] Appl. No.: 272,283

[22] Filed: Nov. 17, 1988

[30] Foreign Application Priority Data

Mar. 17, 1988 [JP] Japan .................................. 63-64192
May 13, 1988 [JP] Japan ................................ 63-117416

[51] Int. Cl.⁵ ............................................. G06F 15/00
[52] U.S. Cl. .................................................... 364/519
[58] Field of Search ... 364/519, 523, 554, 200 MS File, 364/900 MS File

[56] References Cited

U.S. PATENT DOCUMENTS 4,594,674  6/1986  Boulia et al. .......................... 364/523
4,698,755  10/1987  Okazaki et al. ...................... 364/519
4,737,923  4/1988  Matsuzaki et al. .................. 364/519
4,811,242  3/1989  Adachi .................................. 364/519

FOREIGN PATENT DOCUMENTS

60-252940  12/1985  Japan .................................... 364/519

Primary Examiner—Dale M. Shaw
Assistant Examiner—Michael A. Jaffe
Attorney, Agent, or Firm—Blum Kaplan

[57] ABSTRACT

A printer for receiving print instructions from one of a plurality of host units includes an input data storage unit for storing the data including control codes and character codes input by the selected host unit. At least two print control units having internal character code/control code groups process the data in the input data storage unit in accordance with the internal control codes. A character code/control code judging unit decodes the plurality of character codes/control code groups stored in the input data storage unit and determines which print control unit is to process the data by comparing the input control code groups with the internal control code groups of each print control unit.

7 Claims, 5 Drawing Sheets

| $E_{SC}$ | A | 30H | $E_{SC}$ | B | 00H | $E_{SC}$ | "C" | "6" | "7" | "8" | CR | LF |

FIG. 4B

|  | EFFECTIVE REGION | $P_{MAX}$ |
|---|---|---|
| CR | — | 1 |
| LF | — | 1 |
| Esc A n | n=30H OR 31H | 3 |
| Esc B n | $\phi \leq n \leq 255$ | 2 |
| Esc C | — | 1 |
|  |  |  |

FIG. 4C

|  | EFFECTIVE REGION | $P_{MAX}$ |
|---|---|---|
| CR | — | 1 |
| LF | — | 1 |
| Esc A n | $\phi \leq n \leq 255$ | 2 |
| Esc B n | n=30H OR 31H | 3 |
| Esc D | — | 1 |
|  |  |  |

FIG. 4D

|  | $E_{SC}$ | "A" | 30H | $E_{SC}$ | "B" | 00H | $E_{SC}$ | "C" | "6" | "7" | "8" | CR | LF |  |
|---|---|---|---|---|---|---|---|---|---|---|---|---|---|---|
| $P_1$ | 3 | 2 | 1 | (3) |  |  |  |  |  |  |  | 1 | 1 | $\Sigma P_1 = 8$ |
| $P_{1MAX}$ | 3 | 2 | 1 |  |  |  |  |  |  |  |  | 1 | 1 | $\Sigma P_{1MAX} = 8$ |
| $P_2$ | 2 | $\phi$ | $\phi$ | (4) |  |  |  |  |  |  |  | 1 | 1 | $\Sigma P_2 = 4$ |
| $P_{2MAX}$ | 2 | 3 | 1 |  |  |  |  |  |  |  |  | 1 | 1 | $\Sigma P_{2MAX} = 8$ |

PRINTER AND METHOD FOR UTILIZING CHARACTER CODES AND CONTROL CODES WITHIN A PRINTER

BACKGROUND OF THE INVENTION

This invention relates in general to a printer, and in particular to a printer which utilizes character codes and control codes input from a plurality of host units to effect printing.

The connection of a single printer to a variety of host units is known in the art. During operation of these conventional printers, printing is performed by the printer in accordance with groups of character codes and control codes corresponding to instructions from each of the host units. As a result, the types of host units compatible with the printer becomes limited. Because of this shortcoming, to utilize a plurality of groups of character codes and control codes, the actual printer embody includes a plurality of print control units which must be selectively changed by manually actuated switches to become compatible with the different host units as well as a cartridge which includes an outwardly attachable/detachable print control means which is inserted into the printer.

Such prior art devices have been satisfactory, however, the use of such devices requires selective conversion of the print control unit after confirmation of the type of host unit which is connected to the printer. This connection process requires a large amount of labor. Additionally, in those cases in which the printer has been adjusted from one kind of host unit to a different kind of host unit and compatibility is not perfected, meaningless data is printed by the printer.

Accordingly, it is desirable to provide a printer to overcome the shortcomings of the prior art devices described above.

SUMMARY OF THE INVENTION

Generally speaking, in accordance with the invention, a printer includes an input data storage buffer for storing the data received from one of a plurality of host units. The stored data includes character codes and control codes associated with each host unit. A plurality of print control units control the printing of the data stored in the buffer in accordance with internal syntax codes. A print control code group judging unit determines which of the print control units will print which group of data based upon the contents of the data stored in the buffer.

The print controlling code group judging unit compares the data stored in the data buffer with the control code syntax of each print control unit. A numerical weight is assigned to the coincidence of the stored control codes and the internal syntax codes. A maximum comparison number is derived for each print control unit. A ratio is taken between the maximum number and the actual number derived from the comparison for each print control unit. The ratios derived from each print control unit are compared and the print control unit which is to print the data stored in the buffer is chosen based upon this comparison. The character code/control code group judging unit analyzes data received from the buffer in terms of probabilities by making the data correspond to known character code/control code groups as described above and determines the character code/control code group by which stored data was sent.

Accordingly, it is an object of this invention to provide an improved printer and method for selecting and outputting character codes and control codes corresponding to host units.

Another object of this invention to provide a printer capable of automatically selecting and outputting character codes and control codes corresponding to a plurality of host units.

Still another object of this invention is to provide a printer which automatically determines the type of character codes and control codes input by the host units.

Still other objects and advantages of the invention will in part be obvious and will be apparent from the specification and drawings.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
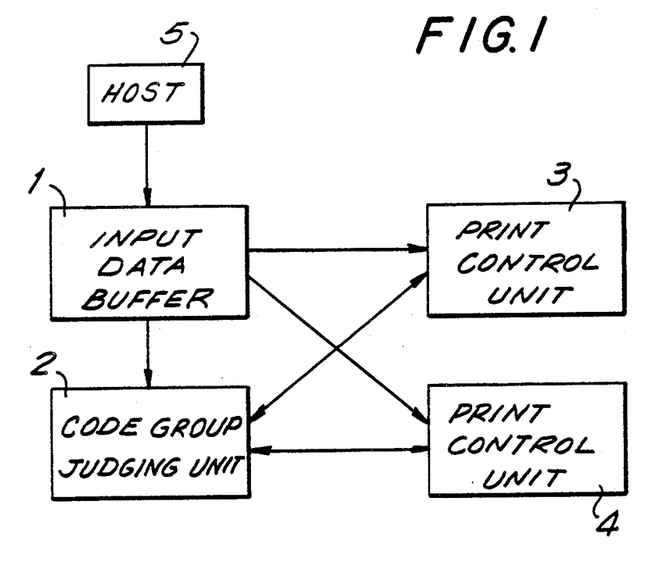
FIG. 1 is a block diagram of a printer constructed in accordance with the invention.

Reference is first made to FIG. 1 in which a block diagram of a printer constructed in accordance with the invention is shown. The printer includes an input data buffer 1 which receives data from a host computer 5 of a plurality of host computers to which the printer is connected. A first print control unit 3 and a second print control unit 4 selectively receive the data stored in input data buffer and print the data received from host computer 5 in accordance with character codes and control codes specific to each print control unit 3, 4. A character code/control code group judging unit 2 receives the data stored in the input data buffer 1 and determines which print control unit will control the printing of the data stored in input data buffer 1.

The data transferred from host computer 5 is temporarily stored in input data buffer 1. After a predetermined amount of data has been stored in input data buffer 1 or the final bit of data has been received by input data buffer 1, the data stored in input data buffer 1 is decrypted by character code/control code group judging unit 2. If the next transfer of data is not performed within a predetermined time period, the last transferred data is considered to be the final bit of data.

Figure 2:
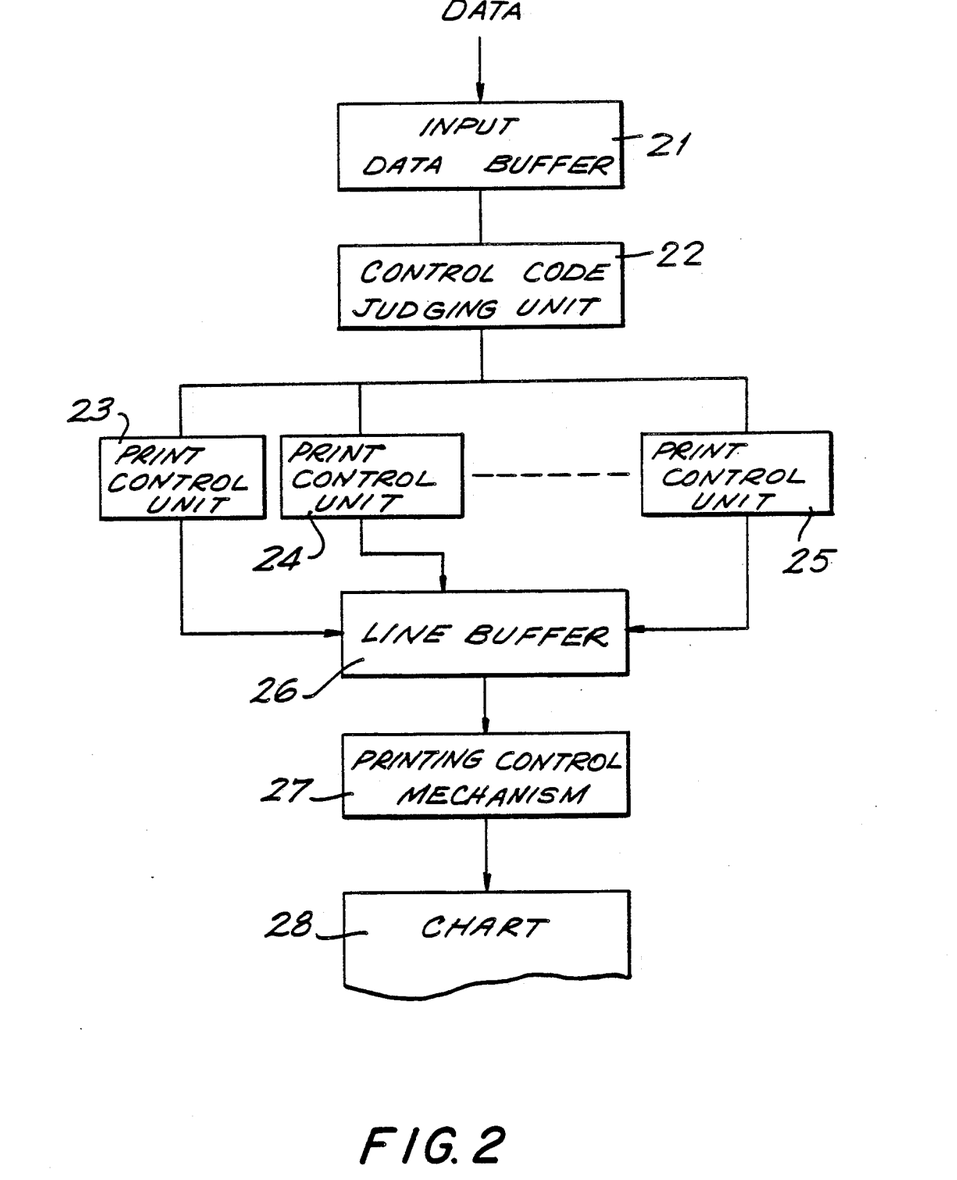
FIG. 2 is a second block diagram of a printer constructed in accordance with the invention.

Reference is now made to FIG. 2 in which a second block diagram illustrating the operation of the printer of FIG. 1 is depicted. An input data buffer 21 stores data received from the host units. A control code judging unit 22 sequentially decodes data input from input data buffer 21. A plurality of print control units 23-25 each have internal control codes and character codes specific to the operation of print control units 23-25. Control code judging unit 22 makes a comparative examination of the input data based upon a number of characteristics of the data read out from input data buffer 21 and the internal control codes of print control units 23-25. Control code judging unit 22 determines whether the input data corresponds to any one of the plurality of character code groups or control code groups specific to print control units 23-25. Once the data has been identified as corresponding to the specific character code and control code of a given print control unit, the data is then processed by that associated print control unit 23-25. The data is then stored in a line buffer 26 and thereafter printed by a printing control mechanism 27, such as a printer head, on a print medium such as chart 28.

To improve the accuracy of the judging process of control code judging unit 22, the control codes of the data transferred from input data buffer 21 are classified into three groups; a group in which the (a) codes correspond to a specific group of codes for a specific print control unit; (b) codes which exist in each of the print control units for an effective or distinct range of values; and (c) control codes which exist in each of the print control units and are effective in the same ranges of argument values for each of the print control units. The codes are also weighted in accordance with these groups in a manner described in greater detail below.

Accordingly, the control codes stored as part of the data input to data buffer 21 are classified into groups of control codes and their association with a group of control codes specific to a particular print control unit. The first group consists of control codes specific to a particular print control unit control code group. The second group includes control codes which exist in a plurality of groups of control codes pertaining to a plurality of print control units having a sequence of effective parameters which differ between the control codes of each print control unit. The third group consists of control codes which exist in a plurality of print control unit code groups and have a sequence of parameters which are effective for each of a group of control codes.

Control code judging unit 22 makes determinations based upon which type of control code is input from data buffer 21. If the control code is one which is particular to a specific print control unit, then control code judging unit 22 assumes that there is a high probability that the control code input from input data buffer 21 is to be operated upon by the print control unit having that specific internal print control code. When the control code exists in a plurality of print control units and has different effective ranges in each print control unit, control code judging unit 22 determines that the probability that the data from input data buffer 21 is to be controlled by that particular print control unit is high when the control code data falls within the effective range, but that the probability of coming within that control region is low. When the control codes correspond to control codes found in a plurality of print control units and are effective in the same ranges between print control units, control code judging unit 22 determines that there is no object to be controlled. Based upon this criteria, control code judging unit 22 may express the relationships as a numerical value of probability that each control code belongs to a specific group of control codes associated with a specific print control unit and further that each print control unit's group of control codes corresponds to a maximum numerical value. This process allows for control code judging unit 22 to select the appropriate print control unit 23-25 to control the printing of the data stored in input data buffer 21.

Referring back to FIG. 1, character code/control code judging unit 2, corresponding to control unit 22 of FIG. 2, determines the degree to which the data stored in input data buffer 1 coincides with internal control code syntax associated with each specific print control unit 3, 4. Character code/control code group judging unit 2 determine whether print control unit 3 or print control unit 4 is to process the data stored in input data buffer 21 based upon the control code syntax stored within print control unit 3 and print control unit 4. When comparing the control codes of the data stored in input data buffer 21 with the control codes associated with each print control unit 3 and 4, code group judging unit 2 gives each control code stored in input data buffer 1 a relative numerical weight. Control codes having a length more than one byte and having an argument in which the data of the argument falls with in the effective range for the print control unit control code group are awarded three points. Control codes having a plural byte length and operating on an argument in which the argument is effective in an entire data region are awarded a value of two points. Control codes having a plural byte length operating on an argument in which the data of the argument portion falls within a non-effective range of the print control unit code group are awarded zero points. Control codes of one or two byte lengths having no argument are awarded one point and undefined control codes are valued at zero points.

The scores are weighted so that the total point value is maximized when a control code of a plural byte length having arguments which are valid for an effective range are identified to facilitate a comparative examination with the stored control codes and effective ranges of the respective print control units. The scores are weighted to maximize these types of control codes and provide a remarkably small probability that a sequence of random numerical values stored in input data buffer 1 falls within an effective argument range. Paradoxically, if the sequence of numerical values stored in input data buffer 1 satisfies the effective range of control code arguments, the probability that the sequence of the numerical values of data is associated with a specific print control unit is high. For the above described reason, control codes of two or one byte having no argument are given less weight than those control codes operating on an argument and no points are given to undefined control codes and control codes which operate on an argument but in which the argument portion is an ineffective range.

The point value assigned to control code groups processed by code group judging unit 2 are represented by P. The total value of $\Sigma P$ for the entire code group is obtained. A total value $\Sigma P_{max}$ corresponds to the numerical value of $\Sigma P$ if all of the control codes of input data buffer 1 coincide with the control code syntax associated with print control unit 3 or 4. $P_{max}$ represents a total maximum obtainable score assuming the data stored in input data buffer 1 corresponds in a one to one relationship with the control code associated with either print control unit 3 or print control unit 4. It is therefore possible to obtain a magnitude of probability that the random data stored in input buffer 1 includes data corresponding to the control codes of print control unit 3 or print control unit 4 by determining a magnitude of $\Sigma P$ with respect to $\Sigma P_{max}$. This determination is made by obtaining such a magnitude of probability in regard to print control units 3 and 4.

Figure 3:
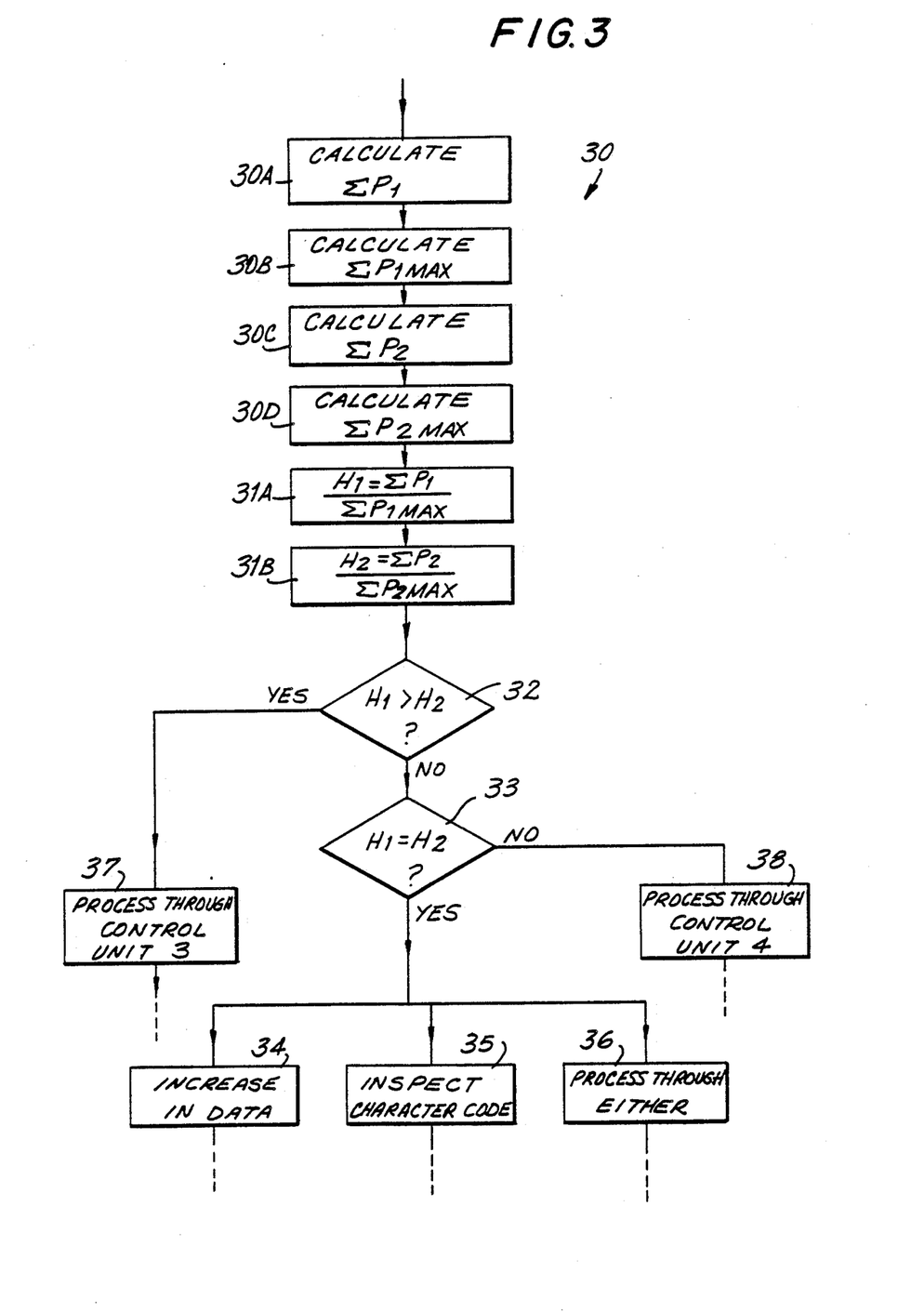
FIG. 3 is a flow chart for the operation of the control code/character code judging unit in accordance with the invention.
Figure 4A:
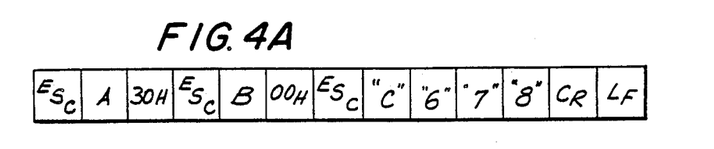
FIG. 4A is a representative sequence of data stored in the data buffer of FIG. 1.
Figure 4B:
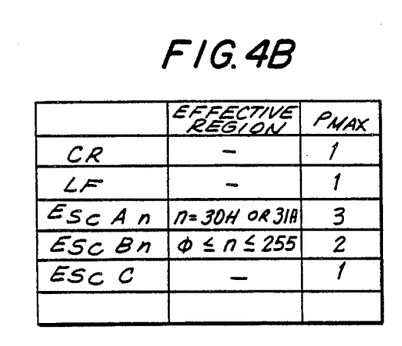
FIG. 4B is a diagrammatic representation of the control codes contained within print control unit 3 of FIG. 1.
Figure 4C:
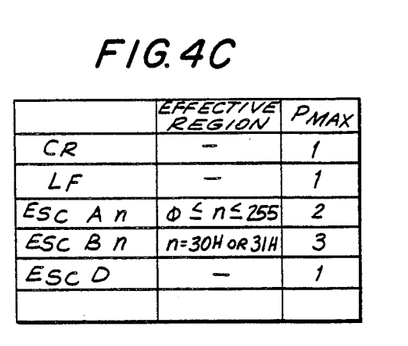
FIG. 4C is a diagrammatic illustration of the control codes of the print control unit 4 of FIG. 1.
Figure 4D:
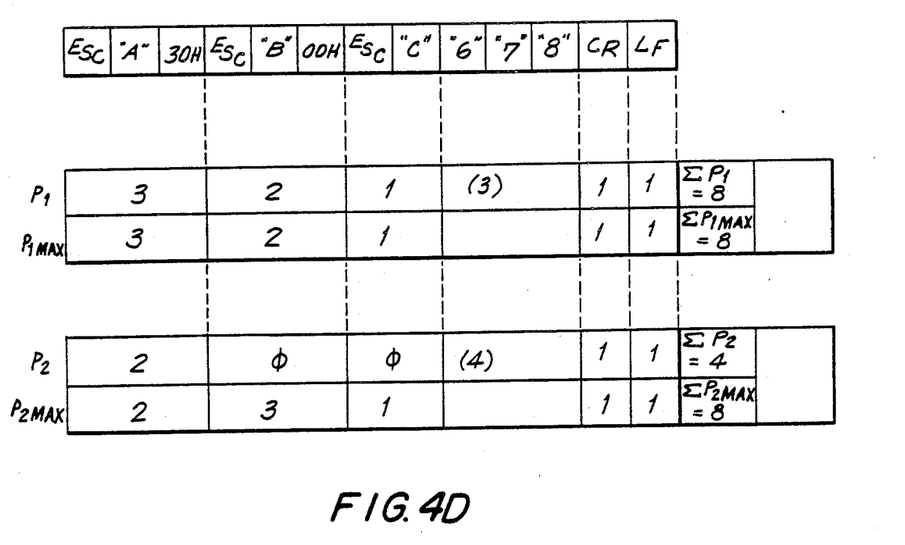
FIG. 4D is a graphical representation of the weighted probabilities internally produced within code control/character control judging unit of FIG. 1.

Reference is now made to FIG. 3 wherein a flow chart is provided for defining the operation of code group judging unit 2 and to FIG. 4A in which a sequence of data stored in input data buffer 1 is provided. FIG. 4B is a diagram showing an example of the internal control codes of print control unit 3 and FIG. 4C is a diagram illustrating the internal control codes of print control unit 4. In accordance with a step 30A, character code/control code group judging unit 2 compares the data stored in input data buffer 1 with the control code syntax of print control unit 3 to determined $\Sigma P1$. In a step 30B, the value for $\Sigma P_{1max}$ is computed for control unit 3. The calculation of $\Sigma P$ and $\Sigma P_{1max}$ are illustrated in FIG. 4D and will be described in greater detail below. Next, in accordance with a step 30C, character code/control code group judging unit 2 compares the data stored in input data buffer 1 with the control code syntax of print control unit 4 and computes $\Sigma P_2$ corresponding to the point values of the data stored in input buffer 1 applied to the control code syntax of print control unit 4. In accordance with step 30D, the maximum point value, $\Sigma P_{2max}$ for print control unit 4 is determined.

In the example codes used in FIG. 4, $\Sigma P_1=8$, $\Sigma P_{1max}=8$, $\Sigma P_2=4$ and $\Sigma P_{2max}=8$. In this embodiment of the invention, it is not the actual codes which are compared, but rather the relationship to a maximum value. In step 31A, a first weight value $H_1$ corresponding to a weighted value of print control unit 3 is determined by dividing $\Sigma P_1$ by $\Sigma P_{1max}$. In a step 31B, a weighted average for the control codes corresponding to print control unit 4 are set by dividing $\Sigma P_2$ by $\Sigma P_{2max}$ and setting that value equal to $H_2$. These relationships are by way of example only and other relationships which result in the numerical probability discussed above may also be used.

The actual calculations of $\Sigma P_1$, $\Sigma P_{1max}$ and $\Sigma P_2$ and $\Sigma P_{2max}$ are illustrated with concrete examples of FIGS. 4A-4D. Comparing the data stream of FIG. 4A stored in input data buffer 1 with internal control codes of print control unit 3 as illustrated in FIG. 4B, it is noted that control code CR does not have an argument. Accordingly, code group judging unit 2 awards a point value of one to this control code (FIG. 4D). This is also the maximum value awarded to code CR so the value for $P_{max}$ is also equal to one (FIG. 4B, 4D). For the control code ESC A n, an argument n is acted upon to provide the value. As seen in FIG. 4D the effective range for this control code n is 30H or 31H. As explained above, when the argument value is within the effective range, code group judging unit 2 awards that code control a value of three points. Accordingly, $P_{max}$ is equal to three for this effective range in print control unit 3. As shown FIG. 4A, the actual argument value is in fact 30H so that the value for $P_1$ is also three because the argument does fall within the effective range. In the case of control code ESC B n, the effective range for the argument is n having a value between 0 and 255. Because n may be expressed in one byte, 00_FFH can probably be provided in hexadecimal form so that the point value assigned by code group judging unit 2 is two because this is a control code in which the argument has a probability of utilizing the entire data region.

Values for P and $P_{max}$ may similarly be set for print control unit 4 as shown utilizing the internal code controls of print control unit 4 shown in FIG. 4C.

Referring more specifically to FIG. 4D, the values of $\Sigma P_1$, $\Sigma P_{1max}$, $\Sigma P_2$ and $\Sigma P_{2max}$ are more clearly defined. As discussed above, in connection with the control code ESC B OOH, the code would have a value of three when being compared with the internal code of print control unit 4 if the argument n is 30H or 31H. However, in this case, the argument is OOH so that $P_2=0$ because the argument falls in a non-effective region. Similarly, when applying the control code ESC C to the internal code of print control unit 4, there is no corresponding control code so again the assigned point value is zero. However, print control unit 4 does contain an internal control code ESC D which is assigned a $\Sigma P_{2max}$ value of one. However, there is no corresponding control code in the data sequence of FIG. 4A so that receives a zero value for determining $\Sigma P_2$ while providing a value of one for determining $\Sigma P_{2max}$.

By adding up all the P values and $P_{max}$ values as calculated in FIG. 4D, it can be seen that $\Sigma P_1=8$, $\Sigma P_{1max}=8$, $\Sigma P_2=4$ and $\Sigma P_{2max}=8$. Accordingly, in accordance with step 31A, $H_1=1$ and in accordance with step 31B $H_2=\frac{1}{2}$. In a step 32 the value of $H_1$ is compared to the value of $H_2$. If $H_1 > H_2$, code group judging unit 2 determines that control unit 3 is to process the data from input data buffer 1 in accordance with a step 37. In a step 33, it is determined whether $H_1=H_2$. If it does not and $H_1 < H_2$, code group judging unit 2 determines that the data from input data buffer 1 is to be processed by print control unit 4 in accordance with step 38.

When $H_1=H_2$, there is a high probability that the data stored in input data buffer 1 includes control code having syntax common to both print control units or that the data consists entirely of character codes. In some cases, the judgment can be made by augmenting the prescribed value and increasing the amount of data used to make the determination by code group judging unit 2 in accordance with a step 34. An additional check is effected on the character codes input from input data buffer 1 in accordance with a step 35. If a comparison of the undefined codes can be performed, the probability that the data does not correspond to a particular print control unit is high. Generally, when $H_1=H_2$, the determination can be made by performing the above process. Nevertheless, if the determination remains ambiguous, the processing may be carried out either by print control unit 3 or by print control unit 4 in accordance with a step 36.

In the example utilized above, $H_1=8/8$ and $H_2=4/8$ so that $H_1 > H_2$. Accordingly, the data of FIG. 4A corresponds to the data of print control unit 3. After determining whether print control unit 3 or print control unit 4 is used, character code/control code group judging unit 2 transfers the processing of the data from the input data buffer 1 to either print control unit 3 or 4 thereby ending the determination process. Next, the print control unit which has been selected by character code/control group judging unit 2 to process the data initiates the printing process of the data stored in input data buffer 1 in accordance with a predetermined procedure.

The processed data is classified into two categories. The first category of data is that data used only for the determination process conducted by code group judging unit 2. The second data type is the data whose quantity exceeds that of the data utilized for the determination process and whose range extends to the interruption of the data transferred from the host unit. If the processing of the data occurs in a state where the code group judging unit 2 does not provide any determination, then the data used only for judgment is processed. Judging accuracy is improved by making a secondary determination on the next sequence of data. If a determination is made by code group judging unit 2 then either classification of the processing data quantity may be adopted. However, the processing capabilities are enhanced by utilizing the second category. After processing the above described data, print control unit 3 or print control unit 4 returns the processing function to character code/control code group judging unit 2.

Using the example of FIG. 4A, because the control codes ESC.. SR, CF are used for determination, the data up to CR are processed by print control unit 3. Thereafter the controlling process is returned to control code group judging unit 2.

In this embodiment, the above description has been made based upon two different print control units. However, the present invention contemplates embodiments utilizing the above method with three or more different types of print control units.

Figure 5A:
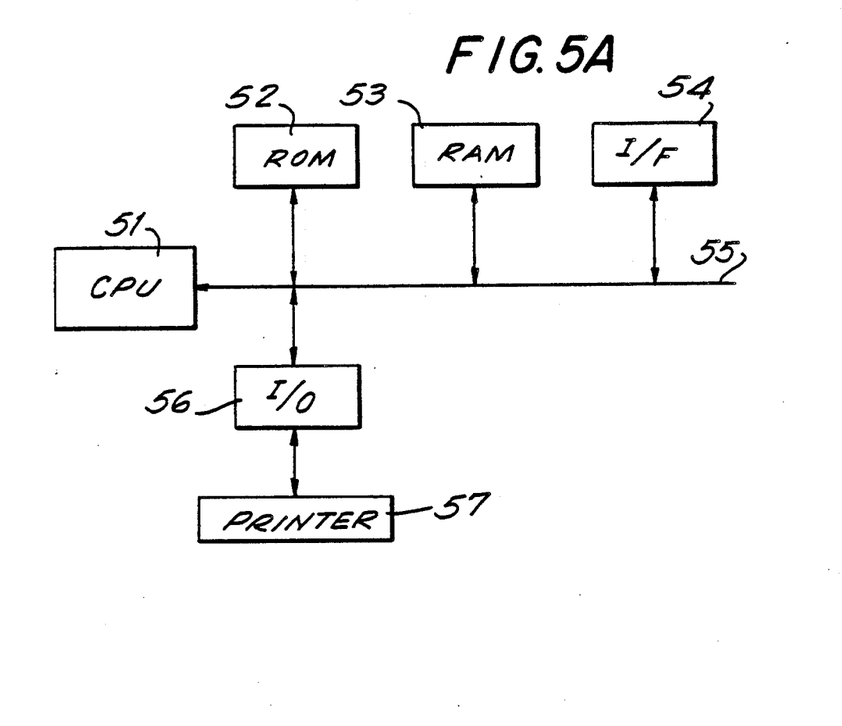
FIGS. 5A through 5C are block diagrams of the printer hardware containing the invention.
Figures 5B, 5C:
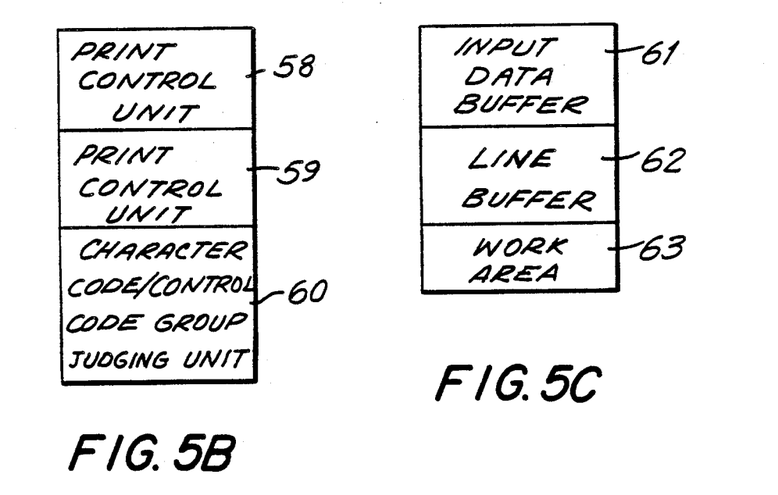

Reference is now made FIGS. 5A-5C in which one embodiment of hardware for incorporating the present invention is depicted. A CPU 51 executes arithmetic operations and analysis and issues input/output commands. A ROM 52 connected to CPU 51 by a bus 55 stores the data and programs of CPU 51. ROM 52 is composed of print control unit 58, a second print control 59 and a character code/control code group judging unit 61 (FIG. 5B). A RAM 53 connected to CPU 51 by bus 55 includes an input data buffer 61 for storing the data transferred from the host units, a line buffer 62 for storing the data to be printed and a system work area 63 utilized by CPU 51 (FIG. 5C). An I/F unit 54 connected to CPU 51 by bus 55 receives the data from the host units and an input/output control circuit 56 connected to CPU 51 by bus 55 controls a printer mechanism 57. After the control codes have automatically been determined, the specific control code which is being transferred by CPU 51 may be arranged to be displayed on an operation panel mounted on printer 57.

It may be determined that $H_1$ belongs to a specific corresponding control code without calculating each $H_i$ if $H_i$ exceeds a given value. When there exists a plurality of control code groups, it is not necessary to obtain each $H_i$ by processing several similar groups corresponding to each print control code group but rather to arrange similar control code groups and their corresponding print control units into a cluster and calculating $H_i$ corresponding to each cluster. In clusters of control groups in which the value $H_i$ is small, the importance of these clusters in the overall operation is low and the calculation of $P_i$ and $P_{imax}$ may be omitted for each print control unit in these clusters.

The present invention is applicable to serial printers such as serial impact dot matrix printers and line printers and to page printers such as laser printers.

Figure 6:
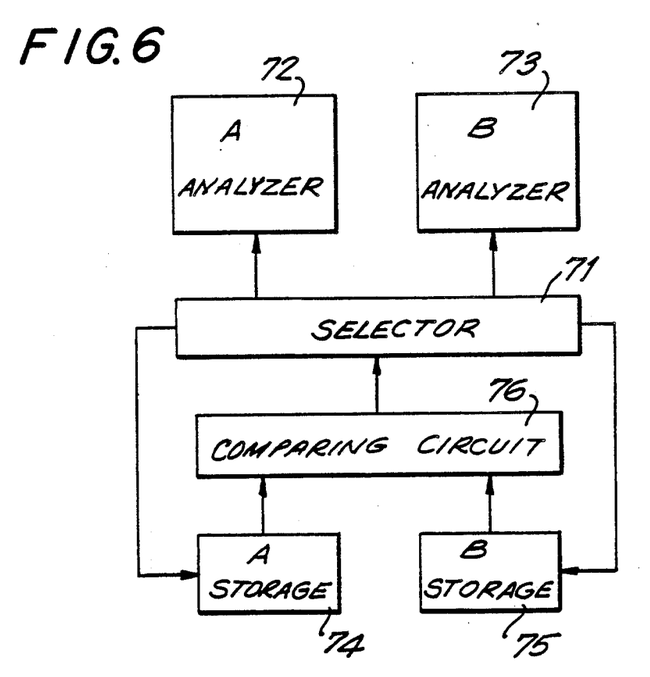
FIG. 6 is a block diagram of a second embodiment of the invention.

Reference is now made to FIG. 6 in which a block diagram depicting a second embodiment of the invention is depicted. An analyzer A 72 analyzes data from a control system A and similarly, an analyzer B 73 analyzes data from control system B. A selector 71 selects either analyzer 72 or analyzer 73 on the basis of compared results produced by a comparing circuit 76. A storage A 74 counts and stores each time selector 71 selects analyzer 72 and a storage B 75 counts and stores the number of times selector 71 selects analyzer B 73. Both storage A 74 and storage B 75 are nonvolatile memories. If the power supply of the entire system were to be shut-off, the data concerning the number of times each respective analyzer was selected would still be maintained in storage A 74 and storage B 75.

Comparing circuit 76 compares the contents of storage A 74 with storage B 75 and determines whether control system A or control system B has been selected more frequently. A control program executed by a CPU incorporated into the printer corresponds to selector 71, analyzer 72, analyzer 73 and comparing circuit 76. When inputting the power supply or inputting the initialization signal, the comparing circuit 76 reads the contents of storage A 74 and storage B 75 and compares the magnitudes thereof. Comparing circuit 76 provides an output to selector 71 indicating whether storage A or storage B has a maximum content.

By way of example, assume that storage A 74 has a larger count stored therein than storage B 75. Selector 71 receives an output from comparing circuit 76 indicating the higher value in storage A 74. Selector 71 in response to the signal of comparing circuit 76 triggers analyzer A 72 of control code system A. These steps are carried out as part of the initializing process each time the power supply is initially input.

Next, selector 71 determines which control code system is operating. The result of the determination may be classified into three situations. First, the control code system A is still doing the processing. Secondly, the control code system B may be doing the processing. Lastly, a determination can not be made. In the case where the control code system A is doing the processing, selecting means 71 increases the count of storage A 74 by one and triggers analyzer A 72 of control code system A. Analyzer A 72 processes the input data transferred from the outside host in conformity with regulations contained with control code system A. In the case where control code system B is utilized, operation occurs in a manner identical to the above method only substituting analyzer B 73 and storage B 75 respectively. Accordingly, the same process is performed on control code system B. The invention is not utilized in the above two cases. However, the invention is utilized where no determination can be made.

When the printer is incapable of providing a determination, selector 71 permits the control code system which has exhibited the highest degree of frequency of use in the past to remain effective without changing the analyzer selected up to that point. Accordingly when providing a timing, selector 71 is able to initiate a determination process and the flow of processing returns to either the use of analyzer A 72, the use of analyzer B 73 or no determination is made at all. If the determination for a specific control code system is made, selector 71 increases the content of that corresponding storage and triggers the corresponding analyzer. If no determination is made, the analyzers remain in the state they were in up to that point. These steps are then repeated.

In the above embodiment, a comparison between control code systems A and B has been used by way of example. However, any one of three or more control code systems may be selected in accordance with the above description.

By providing a plurality of print control units having internal character codes and control codes corresponding to character codes and control codes from the host units and a judging unit for decoding the transfer data and determining a correspondence between the input control codes and the print control units, it becomes possible to automatically print in accordance with the print control unit best adapted to utilize the control codes input by the host units. Additionally, it becomes possible to do this without the necessity for selectively changing the print control means by confirmation with the host unit.

It will thus be seen that the objects set forth above, among those made apparent from the preceding description, are efficiently attained and, since certain changes may be made in carrying out the above method in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A method for printing data received by a printer from one of a plurality of host units, wherein the data includes a plurality of control codes and character codes associated with one of a plurality of host units and a printer including an input data storage means for storing the data received from the host unit and at least two print control means for controlling the printing of the data in accordance with the plurality of control codes and character codes associated with the host unit, each print control means having internal control code and character code groups associated therewith, comprising the steps of:

assigning a point value to each character code and control code stored in the input data storage means;

assigning a maximum point value for the control code and character code groups associated with each print control means;

comparing a point value of the character code and control code stored in the input data storage means with the maximum point value of the internal code groups of the associated print control means to obtain a numerical value representative of the comparison; and choosing a print control means to process the characters defined by the character codes stored in the input data storage means based upon the numerical value obtained.

2. The method of claim 1, wherein a highest point value is assigned to control codes having a plural byte length and operating on an argument in which the data in the argument portion falls within an effective range with the control code, a second highest point value is assigned to control codes having a plural byte length and operating on an argument in which the argument data includes the entire effective range, a third highest point value is assigned to control codes of one or two byte length having no argument and a least highest point value is assigned to undefined control codes and control codes having a plural byte length and an argument in which the data for the argument falls within a non-effective range for the code.

3. The method of claim 1, further including the step of summing the point values for the control code and character code stored in the input data storage means and summing the maximum point values for each internal control code group for each print control means and comparing the summation of the point values for the control code and character code stored in the initial data means to the summation of the point values and the summation of the maximum point values for each print control means.

4. The method of claim 3, wherein the comparing step includes dividing the summation of the point values by the summation of maximum point values for each print control means.

5. The method of claim 4, wherein the step for choosing of a print control means based on the point value includes comparing a point value of each print control means with a point value of each other print control means, whereby the print control means having a highest numerical value is chosen to process the data from the input data storage means.

6. The method of claim 4, wherein the step for choosing a print control means based on the point value further includes obtaining a numerical value for a print control means by adding additional data information when the numerical values of each respective print control means are equal.

7. The method of claim 6, further including the step of allowing printing to be controlled by any of the plurality of print control means when the numerical values of each respective print control means are equal.

* * * * *